United States Patent
Hatanaka et al.

(10) Patent No.: US 10,701,200 B2
(45) Date of Patent: Jun. 30, 2020

(54) ELECTRONIC DEVICE, CONTROL METHOD AND NON-TRANSITORY STORAGE MEDIUM FOR ASSOCIATING A TEXT MESSAGE WITH A CALL

(71) Applicant: KYOCERA Corporation, Kyoto-shi, Kyoto (JP)

(72) Inventors: Akihito Hatanaka, Yokohama (JP); Tomoki Iwaizumi, Yokohama (JP); Hisae Honma, Yokohama (JP); Kosuke Nagase, Yokohama (JP); Tomohiro Sudou, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/526,975

(22) Filed: Jul. 30, 2019

(65) Prior Publication Data
US 2020/0036830 A1    Jan. 30, 2020

(30) Foreign Application Priority Data
Jul. 30, 2018    (JP) ................ 2018-142079

(51) Int. Cl.
*H04M 1/725* (2006.01)
*H04L 29/12* (2006.01)
*H04L 12/58* (2006.01)
*G06F 3/0482* (2013.01)

(52) U.S. Cl.
CPC ...... *H04M 1/72552* (2013.01); *G06F 3/0482* (2013.01); *H04L 51/02* (2013.01); *H04L 61/1594* (2013.01); *H04M 1/72583* (2013.01); *H04M 2201/42* (2013.01)

(58) Field of Classification Search
CPC ........ H04M 1/72552; H04M 1/72583; H04M 2201/42; H04L 51/02; H04L 61/1594; G06F 3/0482
See application file for complete search history.

(56) References Cited

U.S. PATENT DOCUMENTS

| | | | | |
|---|---|---|---|---|
| 2010/0322399 | A1* | 12/2010 | Couse ............... | H04M 3/42382 379/93.17 |
| 2013/0155590 | A1* | 6/2013 | Tani .................... | H04M 1/0237 361/679.01 |
| 2015/0111549 | A1* | 4/2015 | Ashtikar ............. | H04M 3/4365 455/415 |
| 2015/0363059 | A1* | 12/2015 | Tsunoda .......... | H04M 1/274583 715/739 |
| 2016/0234381 | A1* | 8/2016 | Alfano ..................... | H04M 3/02 |

FOREIGN PATENT DOCUMENTS

JP      4627520 B2    2/2011

* cited by examiner

*Primary Examiner* — Nizar N Sivji
(74) *Attorney, Agent, or Firm* — Hauptman Ham, LLP

(57) ABSTRACT

An electronic device comprises: a display; a communication unit; and a processor configured to control input of a transmission text message to be transmitted along with making an outgoing call. The processor is configured to, when a call receiver is chosen on the display, execute a process based on add-ons relating to input of the text message.

8 Claims, 15 Drawing Sheets

FIG.3

| FIXED EXPRESSION |
|---|
| HI |
| BUSINESS CONTACT |
| ABOUT ORDER |
| ⋮ |

| USER | LOG |
|---|---|
| HANAKO | I'M GOING HOME |
|  | SNACK IN CUPBOARD |
|  | SUNDAY |
| DAD | ... |
| ⋮ | ⋮ |

9H

FIG.5
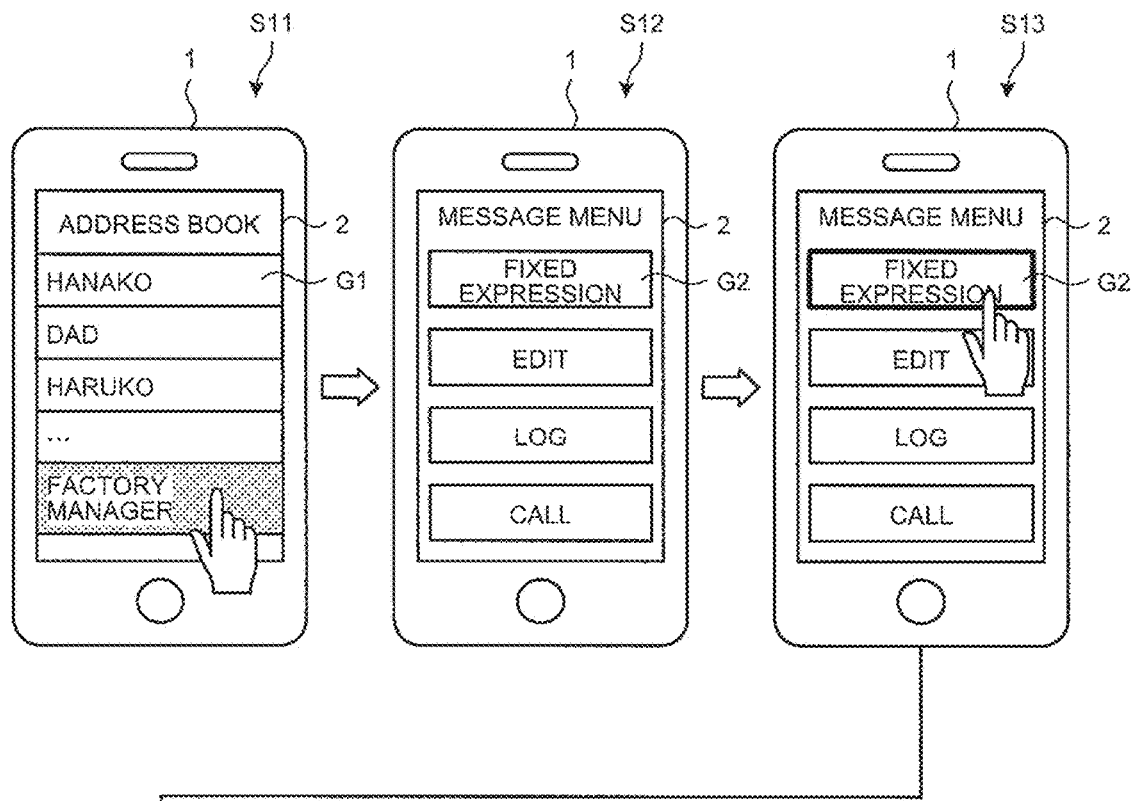
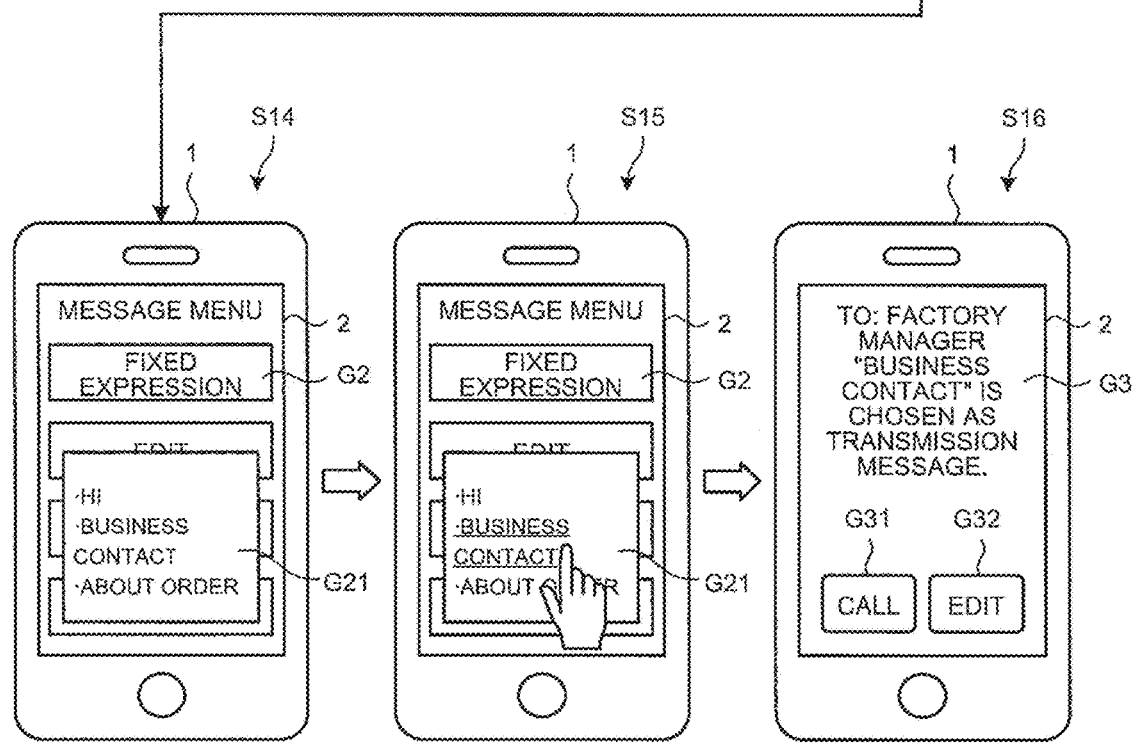

FIG.11
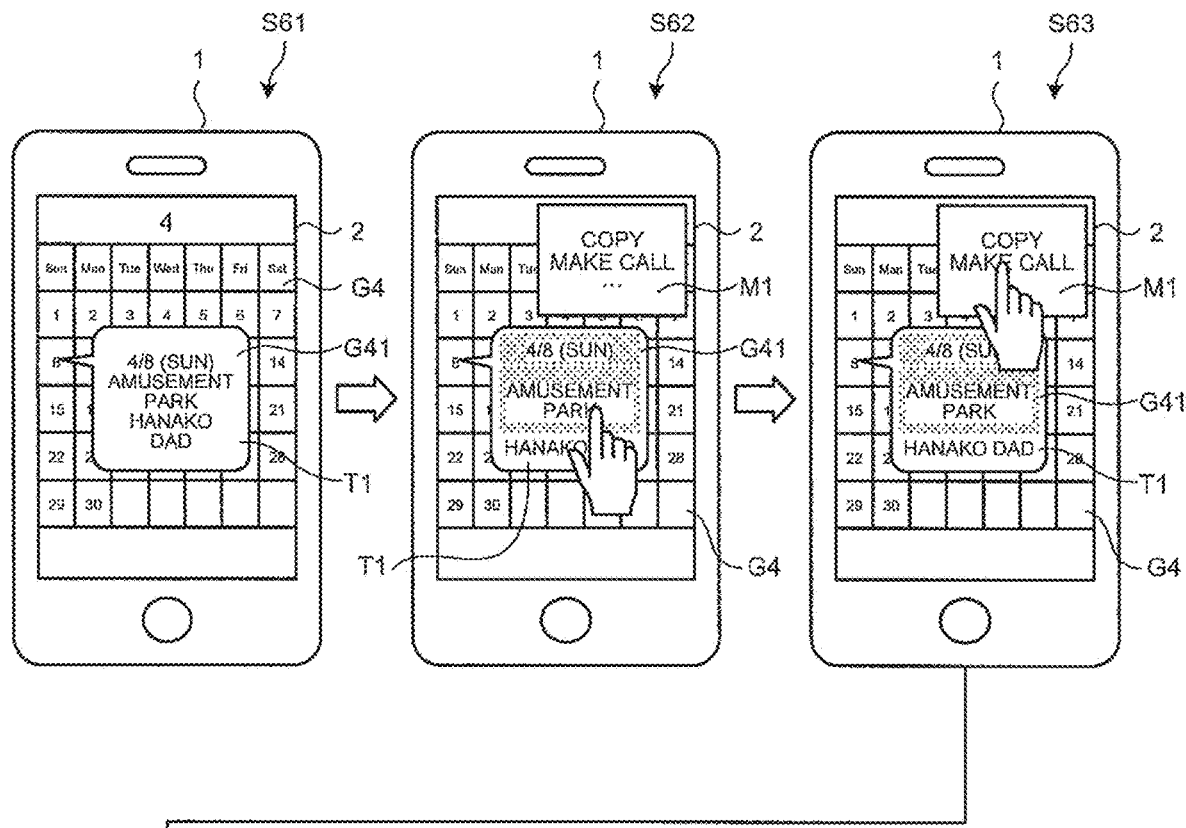
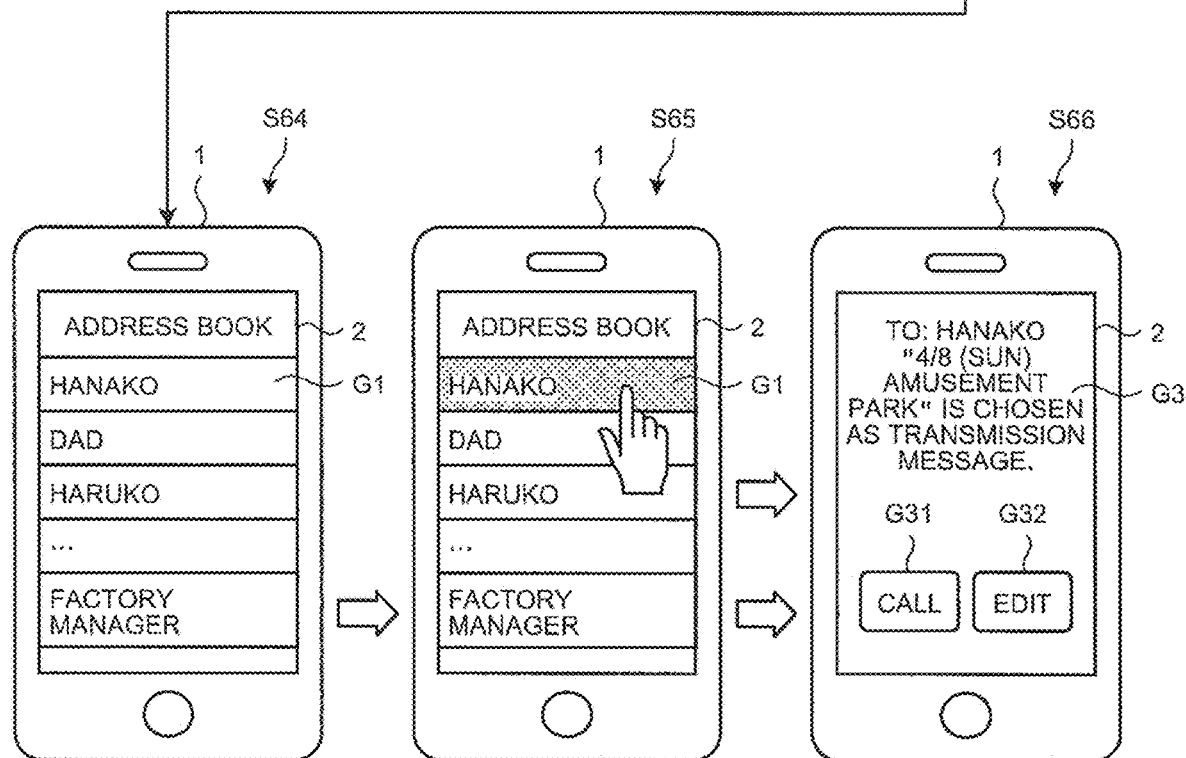

FIG.12
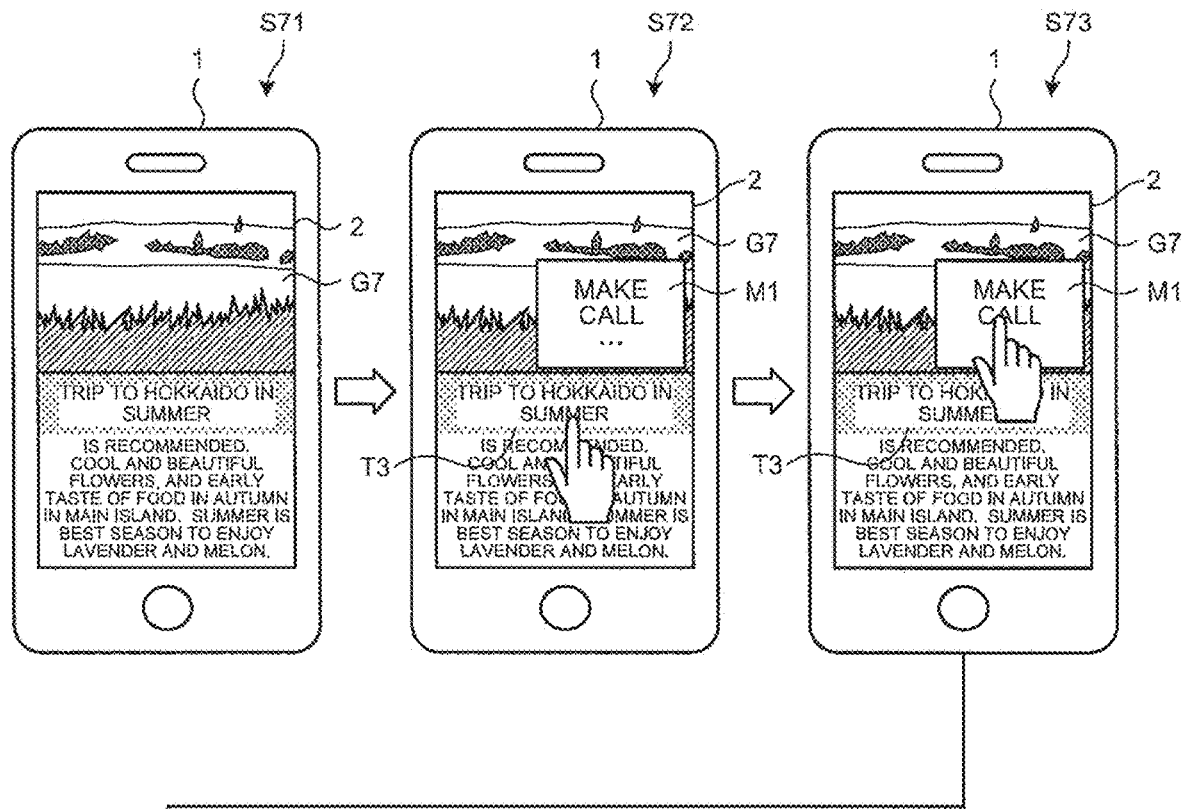
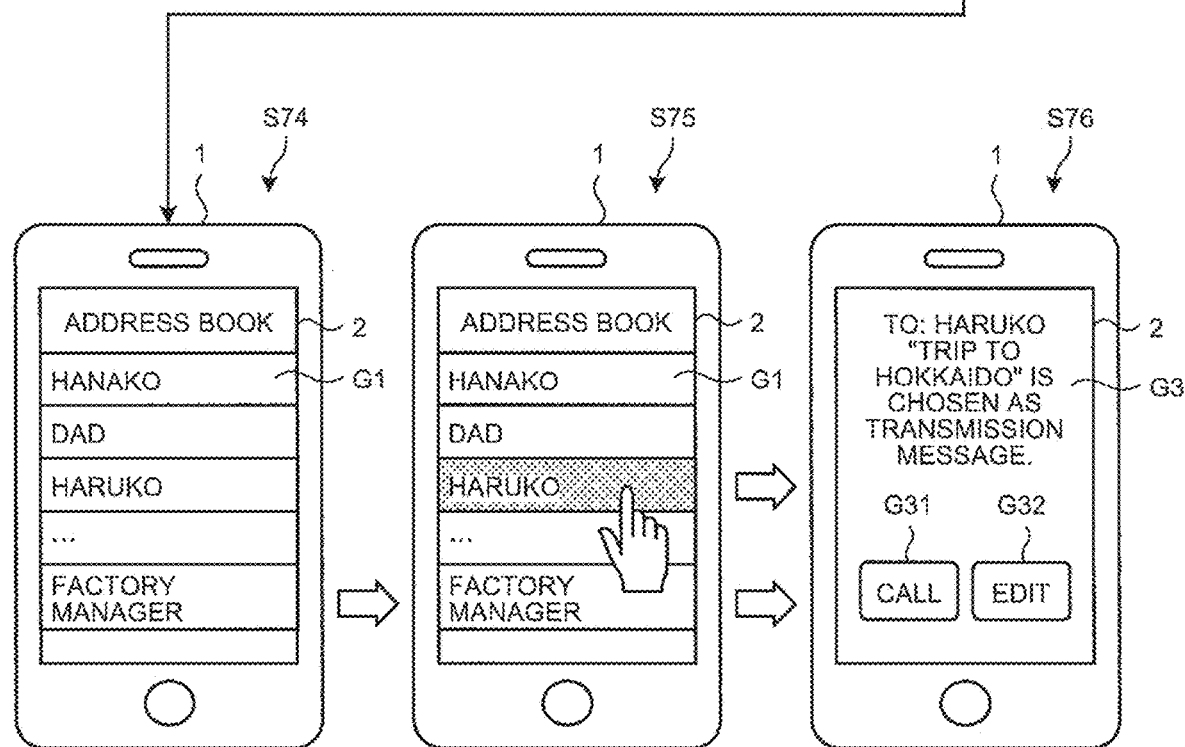

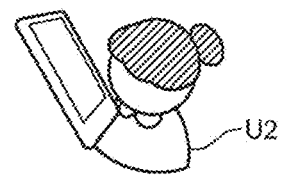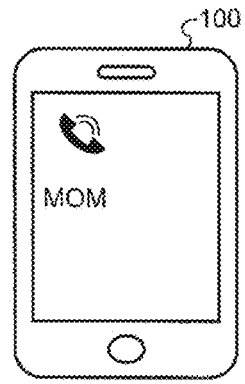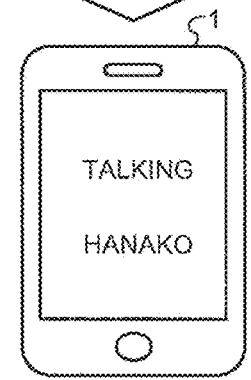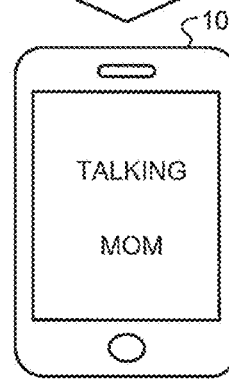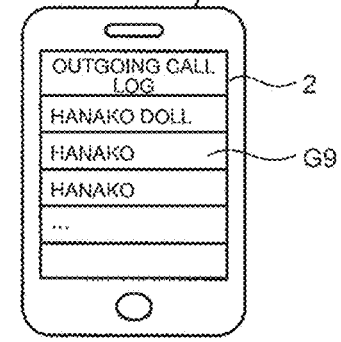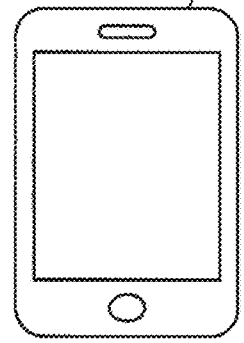
FIG.16

ELECTRONIC DEVICE, CONTROL METHOD AND NON-TRANSITORY STORAGE MEDIUM FOR ASSOCIATING A TEXT MESSAGE WITH A CALL

CROSS-REFERENCE TO RELATED APPLICATION(S)

The present application claims priority under 35 U.S.C. § 119 to Japanese Patent Application No. 2018-142079, filed on Jul. 30, 2018, entitled "ELECTRONIC DEVICE, CONTROL METHOD AND CONTROL PROGRAM", the content of which is incorporated by reference herein in its entirety.

BACKGROUND

1. Technical Field

The present application relates to an electronic device, a control method, and a non-transitory storage medium.

2. Description of the Related Art

Conventionally, there is a conventional technology in which, when an outgoing call is made with a mobile phone of a calling party, text information on a thing to talk, or the like, is input and transmitted to a partner and the phone number of the calling party and the text information are displayed when an incoming call corresponding to the outgoing call comes in on a mobile phone of the partner (receiving party).

SUMMARY

It is an object of the present disclosure to at least partially solve the problems in the conventional technology.

An electronic device according to one embodiment includes a display, a communication unit, and a processor configured to control input of a transmission text message to be transmitted along with, making an outgoing call. The processor is configured to, when a call receiver is chosen on the display, execute a process based on add-ons relating to input of the text message.

A control method according to one embodiment executed by an electronic device including a display and a communication unit is disclosed. The method includes, when a call receiver is chosen on the display, executing a process based on add-ons relating to input of a transmission text message to be transmitted along with making an outgoing call.

A non-transitory storage medium according to one embodiment is disclosed. The storage medium stores a control program for causing, when executed by an electronic device including a display and a communication module, the electronic device to execute, when a call receiver is chosen on the display, executing a process based on add-ons relating to input of a transmission text message to be transmitted along with making an outgoing call.

The above and other objects, features, advantages and technical and industrial significance of this disclosure will be better understood by reading the following detailed description of presently preferred embodiments of the invention, when considered in connection with the accompanying drawings.

BRIEF DESCRIPTION OF THE DRAWINGS

FIG. 3 is a diagram of exemplary fixed expression data according to the embodiment;

FIG. 4 is a diagram of exemplary log data according to the embodiment;

FIG. 5 is a diagram of an exemplary process based on add-ons of the electronic device according to the embodiment;

FIG. 11 is a diagram of an exemplary process based on add-ons of the electronic device according to another embodiment;

FIG. 12 is a diagram of an exemplary process based on the add-ons of the electronic device according to the another embodiment;

FIG. 16 is a diagram of an exemplary process based on the add-ons of the electronic device according to still another embodiment.

DETAILED DESCRIPTION

Figure 1:
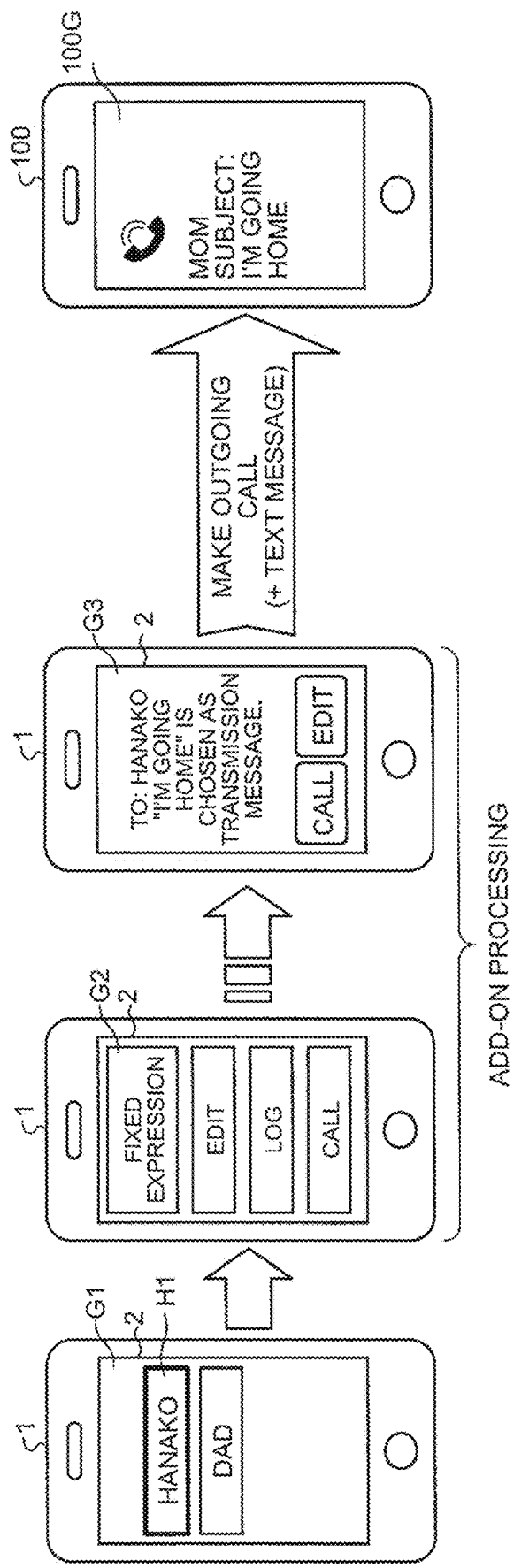
FIG. 1 is a diagram of an overview of a communication system according to an embodiment.

With diversity of methods of making various operational inputs to electronic devices capable of making outgoing calls, there may be room for improvement in operational input methods performed by users to make outgoing calls attached with text information.

Embodiments according to the present application will be described in detail with reference to the drawings. In the following description, like parts can be denoted with the same reference numerals. Furthermore, redundant description can be omitted.

FIG. 1 is a diagram of an overview of a communication system according to an embodiment. The communication system according to the embodiment includes an electronic device 1 having a telephone function and an electronic device 100 having the telephone function. The communication system includes a server (omitted from FIG. 1) to talk and communicate text messages between the electronic device 1 and the electronic device 100. In FIG. 1, the electronic device 1 is exemplified as an electronic device of a calling party that makes an outgoing call to the electronic device 100, and the electronic device 100 is exemplified as an electronic device of a receiving party on which an incoming call from the electronic device 1 comes in. A user U1 of the electronic device 1 talks with a user U2 who uses the electronic device 100 by performing a call-making operation on the electronic device 1.

The electronic device 1 controls input of a transmission text message to be transmitted along with making an outgoing call, which is the overview of the electronic device 1. The electronic device 1 executes a process based on add-ons relating to input of a transmission text message ("transmission message"), which is the outline of the electronic device 1.

For example, when a call receiver H1 corresponding to the user of the electronic device 100 is chosen on an address book screen G1 that displays an address book, the electronic device 1 causes a touch screen display 2 to display a message menu screen G2 containing add-ons relating to input of a transmission message. The add-ons include menu items including fixed expression, edit, and log, etc. Using the add-ons contained in the message menu screen G2, the electronic device 1 implement a process of displaying multiple possible inputs that can be chosen as a transmission message, display of a user interface for editing a transmission message, etc.

The electronic device 1 executes the process based on the add-ons contained in the message menu screen G2, thereby, when a transmission message to be transmitted along with making an outgoing call is determined, causing the touch screen display 2 to display a notification screen G3 that notifies the user U1 of the determined transmission message. The electronic device 1 then executes making an outgoing call attached with the transmission message in response to the call-making operation performed by the user U1 on the notification screen G3.

Figure 2:
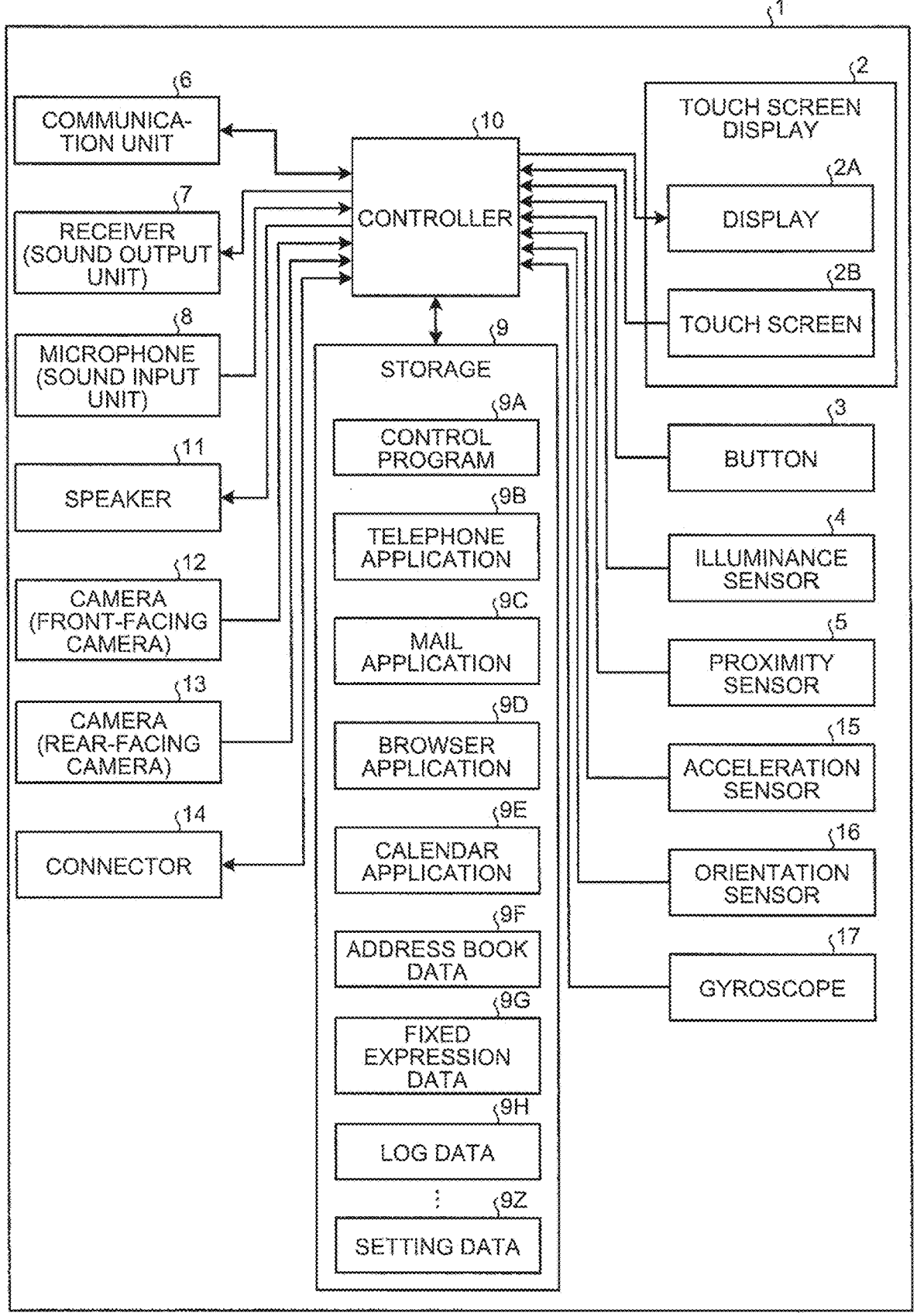
FIG. 2 is a block diagram of an exemplary functional configuration of an electronic device according to the embodiment.

Using FIG. 2, a functional configuration of the electronic device according to the embodiment will be described. FIG. 2 is a block diagram of an exemplary functional configuration of the electronic device according to the embodiment. The electronic device 1 includes the touch screen display 2, a button 3, an illuminance sensor 4, a proximity sensor 5, a communication unit 6, a receiver 7, a microphone 8, a storage 9, a processor 10, a speaker 11, cameras 12 and 13, a connector 14, an acceleration sensor 15, an orientation sensor 16, and a gyroscope 17.

The touch screen display 2 includes a display 2A and a touch screen 2B. The display 2A and the touch screen 2B, for example, may be positioned in a superimposed manner, may be positioned in an aligned manner, or may be positioned in a separated manner. When the display 2A and the touch screen 2B are positioned in a superimposed manner, for example, at least one side of the display 2A need not be along with any side of the touch screen 2B.

The display 2A includes a display device, such as a liquid crystal display (LED), an organic electro-luminescence display (OELD), or an inorganic electro-luminescence display (IELD). The display 2A displays an object, such as texts, an image, a symbol, or a diagram.

The touch screen 2B detects contact or proximity of a finger, a pen, or a stylus pen with or to the touch screen 2B. The touch screen 2B is able to, when multiple fingers, a pen, a stylus pen or the like contacts with or is proximate to the touch screen 2B, detect the position thereof on the touch screen 2B. In the following description, the position in which multiple fingers, a pen, a stylus pen or the like contacts with or is proximate to the touch screen 2B is referred to as "detection position". The touch screen 2B notifies the processor 10 of the contact or proximity of fingers with or to the touch screen 2B together with the detection positon. The touch screen 2B may notify the processor 10 of the contact or proximity by notifying the processor 10 of the detection position. The touch screen display 2 including the touch screen 2B is able to execute operations that the touch screen 2B is able to perform. In other words, operations performed by the touch screen 2B may be performed by the touch screen display 2.

The processor 10 determines a gesture type based on at least one of contact or proximity that is detected by the touch screen 2B, a detection position, a change in detection position, a time duration during which contact or proximity continues, an interval between detections of contact or proximity, and the number of times contact is detected. The electronic device 1 including the processor 10 is able to execute operations performed by the processor 10. In other words, operations performed by the processor 10 may be performed by the electronic device 1. Gestures are operations performed with fingers on the touch screen 2B. The operations performed on the touch screen 2B may be performed by the touch screen display 2 including the touch screen 2B. Gestures determined by the processor 10 via the touch screen 2B include, for example, touch, long touch, release, swipe, tap, double tap, long tap, drag, flick, pinch-in, and pinch-out; however, the gestures are not limited thereto.

The processor 10 performs operations according to the gestures that are determined via the touch screen 2B, thereby realizing intuitive and easy-to-use operability to users. Operations performed by the processor 10 according to the determined gestures may differ according to the screen that is displayed on the display 2A.

A detection method employed by the touch screen 2B may be any method, for example, a capacitive method, a resistive method, a surface acoustic wave method, an infrared method, a load detection method, or the like. The touch screen display 2 is an exemplary display.

The button 3 accepts an operational input from the user. The button 3 includes any number of buttons. The processor 10 cooperates with the button 3 to detect operations on the button 3. Operations on the button 3 include, for example, click, double click, triple click, push and multi-push; however, operations on the button 3 are not limited thereto. The button 3 may be assigned with various functions, for example, a menu button, a power-on button, power-off button (power button), and a reset button. The button 3 may be assigned with a function of executing a sound input process.

The illuminance sensor 4 detects an illuminance. An illuminance is a value of a light flux that is incident on a unit area on a measurement surface of the illuminance sensor 4. The illuminance sensor 4, for example, is used to adjust the brightness of the display 2A.

The proximity sensor 5 performs contactless detection of presence of a nearby object. The proximity sensor 5 includes a light-emitting device that emits infrared light and a light-receiving device that receives the reflected infrared light that is emitted from the light-emitting device. The illuminance sensor 4 and the proximity sensor 5 may be configured as & single sensor.

The communication unit 6 communicates wirelessly. Wireless communication standards supported by the communication unit 6 include, for example, cellular-phone communication standards, such as 2G, 3G, 4G and 5G, and short-distance wireless communication standards. Cellular-phone communication standards include, for example, LTE (Long Term Evolution), W-CDNA (trademark) (Wideband Code Division Multiple Access), CDMA 2000, PDC (Personal Digital Cellular), GSM (trademark) (Global System for Mobile communications), and PHS (Personal Handyphone System).

Short-distance wireless communication standards supported by the communication unit 6 include, for example, WiMAX (trademark) (Worldwide interoperability for Microwave Access), IEEE 802.11, Bluetooth (trademark), IrDA (Infrared Data Association), NFC (trademark) (Near Field Communication), and WPAN (Wireless Personal Area Network). The communication unit 6 may support at least one of the above communication standards.

The communication unit 6 is able to realize communication of various types of data by communicating with an external device, such as a smartphone, a tablet, a digital camera, or a cloud storage. The communication unit 6 is an exemplary communication unit.

The receiver 7 outputs a sound signal from the processor 10 as sound. The receiver 7, for example, is used to output voice of the partner during a talk on the phone. The microphone 8 converts the voice of the user or the like that is input into a sound signal and transmits the sound signal to the processor 10. The microphone 8, for example, is used to input the voice of the user during a talk on the phone.

The storage 9 stores a program and data. The storage 9 may be used as a work area in which the result of processing performed by the processor 10 is temporarily stored. The storage 9 may include any non-transitory storage medium, such as a semiconductor storage medium or a magnetic storage medium. The storage 9 may include multiple typos of storage media. The storage 9 may include a combination of a storage medium, such as a memory card, an optical disk, or a magneto-optical disk, and a device that reads the storage medium. The storage 9 may include a storage device that is used as a temporary storage area, such as a random access memory (RAM).

The program that is stored in the storage 9 contains an application that is executed on the foreground or on the background and a basic program that supports operations of the application. When executed on the foreground, the application displays a screen according to the application on the display 2A. The basic program may contain, for example, an operating system (OS) and firmware. The program may be installed in the storage 9 via wireless communication performed by the communication unit 6 or a non-transient storage medium.

The basic program that is stored in the storage 9 enables provision of functions for implementing a process relating to various operations of the electronic device 1. The functions provided by the basic program include a function of adjusting the brightness of the display 2A based on the result of detection performed by the illuminance sensor 4. The functions provided by the basic program include a function of invalidating an operation on the touch screen 2B based or the result of detection performed by the proximity sensor 5. The functions provided by the basic program include a function of controlling communication with an external device connected via the connector 14. The functions provided by the basic program include a function of performing various types of control, such as changing information displayed on the display 2A, according to the gesture that is determined based on the result of detection performed by the touch screen 2B.

The storage 9 stores a control program 9A, a telephone application 9B, a mail application 9C, a browser application 9D, a calendar application 95, address book data 9F, fixed expression data 9G, log data 9H, setting data 9Z, etc.

The control program 9A cooperates with various applications and and enables provision of various functions for implementing a process unique to the electronic device 1 according to the embodiment. The control program 9A may be implemented with an application that is created dedicatedly or may be implemented by an add-on of an existing program, for example.

The control program 9A cooperates with the telephone application 93 and enables provision of a function for, when a call receiver is chosen on the touch screen display 2, executing a process based on the add-ons relating to input of a transmission message to be transmitted along with making an outgoing call.

The functions provided by the control program 9A include a function of, when a call receiver is chosen on the touch screen display 2, executing a process of causing the touch screen display 2 to display a message menu screen G2 (see FIG. 1) containing the add-ons relating to input of a transmission message to be transmitted along with making an outgoing call.

The functions provided by the control program 9A include a function of, in association with choosing a call receiver, executing a process of causing the touch screen display 2 to display multiple possible inputs that can be chosen as a transmission message. The multiple possible inputs include a fixed expression that is set previously, a log of a message that is communicated with another electronic device, and a text that is contained in an application execution log. As for logs of messages, the functions provided by the control program 9A may include a function enabling display of only logs of messages relating to the same call receiver as possible inputs. As for texts contained in application execution logs, the control program 9A may provide a function enabling display of only texts relating to a chosen call receiver as possible inputs.

The functions provided by the control program 9A include a function of, in association with choosing a call receiver, executing a process of causing the touch screen display 2 to display the user interface for editing a transmission message.

The telephone application 9B enables provision of a function for executing a process of making an outgoing call, receiving an incoming call, and talking by wireless communication. The mail application 9C enables provision of an electronic mail function for creating, transmitting, receiving, and displaying an electronic mail, etc. The browser application 9D enables provision of a WEB browsing function for displaying WEB pages, etc. The calendar application 9E enables provision of a calendar function for schedule management, etc.

The address book data SF records personal information, such as the names of other users, phone numbers, mail addresses, and postal addresses. FIG. 3 is a diagram of exemplary fixed expression data according to the embodiment. As illustrated in FIG. 3, the fixed expression data 9G records data of a text that is set previously as a transmission message. FIG. 4 is a diagram of exemplary log data according to the embodiment. As illustrated in FIG. 4, the log data 9H records data of texts that are communicated with other users and data of texts that are contained in application execution logs. The setting data 9Z contains information on various types of setting on operations of the electronic device 1. The setting data 9Z contains data that is used for various types of processing executed by the control program 9A.

The electronic device 1 may cooperate with a cloud storage via the communication unit 6 and access files and data that the cloud storage stores. The cloud storage may store part of or all the program and data that are stored in the storage 9.

The processor 10 includes an arithmetic processor. The arithmetic processor includes, for example, a central processing unit (CPU), a system-on-a-chip (SoC), a micro control unit (MCU), a field-programmable gate array (FPGA), and a co-processor; however, the arithmetic processor is not limited thereto. The processor 10 integrally controls operations of the electronic device 1 to implement various functions.

Specifically, referring to the data stored in the storage 9 if necessary, the processor 10 executes instructions contained in the program that is stored in the storage 9. The processor 1C controls a function unit according to the data and instructions, thereby implementing various functions. The function unit includes, for example, the display 2A, the communication unit 6, the receiver 7, the microphone 8, the speaker 11, the cameras 12 and 13; however, the function unit is not limited thereto. The processor 10 can change control according to the result of detection performed by the detector. The detector includes, for example, the touch screen 2B, the button 3, the illuminance sensor 4, the proximity sensor 5, the microphone 8, the cameras 12 and 13, the acceleration sensor 15, the orientation sensor 16, and the gyroscope 17; however, the detector is not limited thereto.

The processor 10 executes the basic program that is stored in the storage 9, thereby enabling realization of various types of control on operations of the electronic device 1. The processor 10, for example, is able to execute various types of control, such as changing information displayed on the display 2A, according to the gesture that is determined based on the result of detection performed by the touch screen 2B. The processor 10 is able to adjust the brightness of the display 2A, based on the result of detection performed by the illuminance sensor 4. The processor 10 is able to invalid an operation on the touch screen 2B based on the result of detection performed by the proximity sensor 5. The processor 10 is able to control, for example, communication with an external device that is connected via the connector 14.

The processor 10 executes the control program 9A, thereby cooperating with various applications and enabling implementation of a process unique to the electronic device 1 of the embodiment in addition to the above-described various types of control. For example, the processor 10 cooperates with the telephone application 9B and enables, when a call receiver is chosen on the touch screen display 2, execution of a process based on the add-ons relating to the input of a transmission message to be transmitted along with making an outgoing call.

The processor 10 is able to, when a call receiver is chosen on the touch screen display 2, execute a process of causing the touch screen display 2 to display the message menu screen G2 (see FIG. 1) containing the add-ons relating to input of a transmission message to be transmitted along with making an outgoing call.

The processor 10 is able to, in association with choosing a call receiver, execute a process of causing the touch screen display 2 to display the multiple possible inputs that can be chosen as a transmission message.

The processor 10 is able to, in association with choosing a call receiver, execute a process of causing the touch screen display 2 to display the user interface for editing a transmission message.

The speaker 11 outputs, as a sound, a sound signal that is transmitted from the processor 10. The speaker 11, for example, is used to output a call alert sound and music.

The camera 12 is a front-facing camera that captures an image of an object that faces the front face of the electronic device 1. The camera 13 is an rear-facing camera that captures an image of an object that faces the rear face of the electronic device 1.

The connector 14 is a terminal to which another device is connected. The connector 14 may be a USB (Universal Serial Bus), a HDMI (trademark) (High-Definition Multimedia Interface), a MHL (Mobile High-definition Link), a light peak, a Thunderbolt (trademark), a LAN (Local Area Network) connector, or a general-purpose terminal, such as an car microphone connector. The connector 14 may be a terminal that is designed dedicatedly, such as a Dock connector. The device that is connected to the connector 14 includes, for example, an aircraft, a charger, an external storage, a speaker, a communication device, and an information processing device; however, the device is not limited thereto.

The acceleration sensor 15 detects the direction and magnitude of acceleration applied to the electronic device 1. The orientation sensor 16 detects the direction of geomagnetism. The gyroscope 17 detects an angle and an angular velocity of the electronic device 1. The detection results of the acceleration sensor 15, the orientation sensor 16, and the gyroscope 17 are used in combination in order to detect changes of the electronic device 1 in position and attitude.

Using FIGS. 5 to 9, an exemplary process based on add-ons of the electronic device according to the embodiment will be described. FIGS. 5 to 9 are diagrams of the exemplary process based on the add-ons of the electronic device according to the embodiment.

FIG. 5 illustrates, as the process based on the add-ons relating to input of a transmission message to be transmitted along with making an outgoing call, an exemplary process of causing the touch screen display 2 to display a list of fixed expressions that can be chosen as a transmission message in association with choosing a call receiver.

Specifically, when a call receiver ("factory manager") is chosen on the address book screen G1 that is displayed on the touch screen display 2 (S11), the electronic device 1 displays, on the touch screen display 2, the message menu screen G2 containing the add-ons relating to input of a transmission message to be transmitted along with making an outgoing call (S12).

When "fixed expression" is chosen as a menu item on the message menu screen G2 (S13), the electronic device 1 displays a fixed expression list G21 listing possible inputs that can be chosen as a transmission message on the touch screen display 2 (S14).

When one possible input is chosen on the fixed expression list G21 (S15), the electronic device 1 determines the chosen possible input as a transmission message and displays, on the touch screen display 2, the notification screen G3 that notifies the user U1 of the determined transmission message (S16). On the notification screen G3, the call receiver ("TO: Factory manager") and the transmission message ("business contact") are displayed. The notification screen G3 has a call button G31 for making an outgoing call and an edit button G32 for editing the transmission message. For example, on detecting an operation on the call button G31, the electronic device 1 transmits the transmission message along with making an outgoing call. The notification screen G3 may contain, instead of the edit button G32 or additionally, a "return" button for transition of the screen to a screen that is displayed before the current screen (in other words, the notification screen G3) (e.g., the address book screen G1, the message menu screen G2, or the message menu screen G2 containing the fixed expression list G21).

Figure 6:
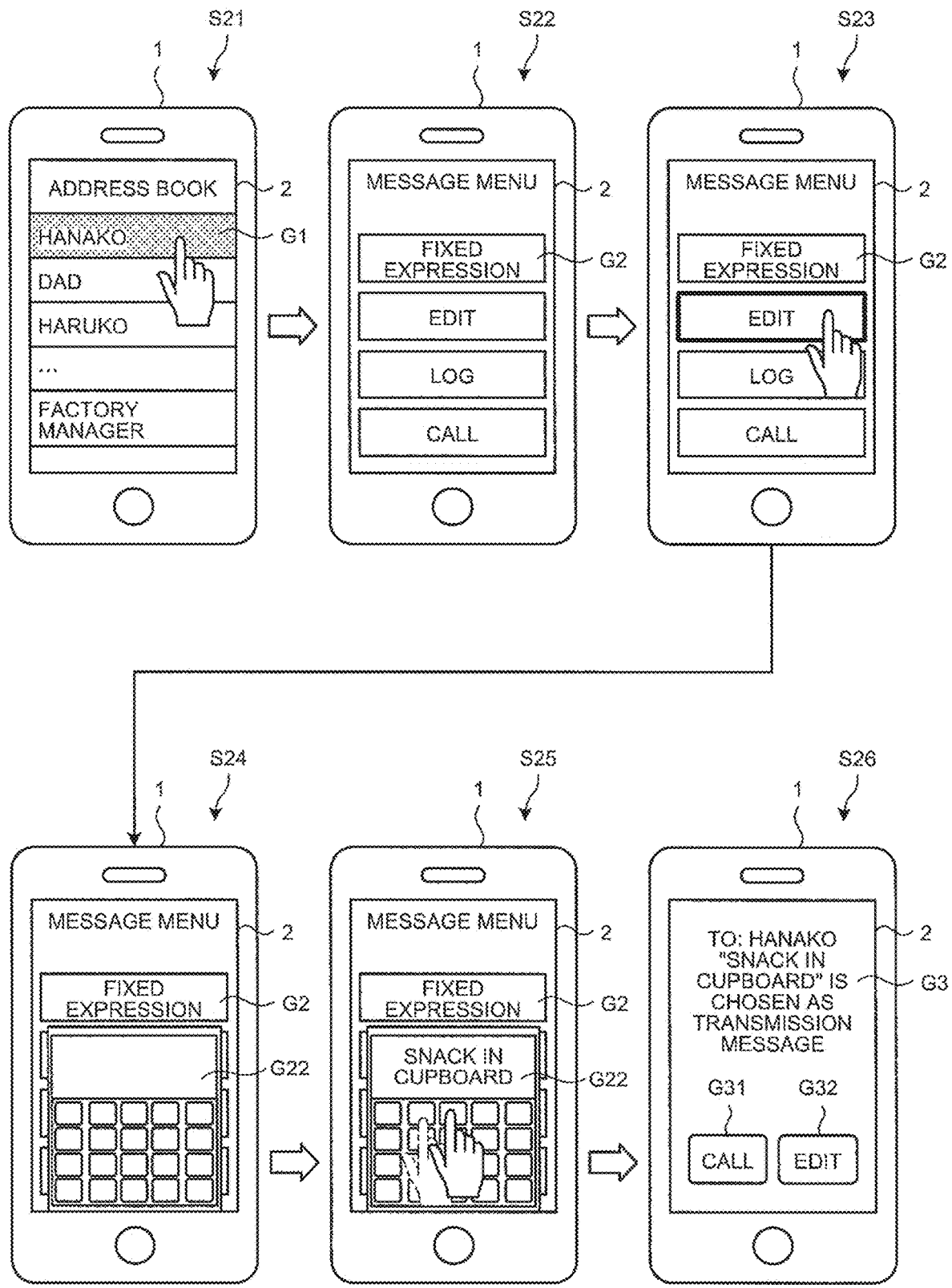
FIG. 6 is a diagram of the exemplary process based on the add-ons of the electronic device according to the embodiment.

FIG. 6 illustrates, as the process based on the add-ons relating to input of a transmission message to be transmitted along with making an outgoing call, an exemplary process of causing the touch screen display 2 to display the user interface for editing a transmission message.

Specifically, when a call receiver ("Hanako") is chosen on the address book screen G1 that is displayed on the touch screen display 2 (S21), the electronic device 1 displays, on the touch screen display 2, the message menu screen G2 containing the add-ons relating to input of a transmission message to be transmitted along with making an outgoing call (S22).

When "edit" is chosen as a menu item on the message menu screen G2 (S23), the electronic device 1 displays a software keyboard G22 for editing a transmission message on the touch screen display 2 (S24).

When a text that is entered on the software keyboard G22 is determined (S25), the electronic device 1 determines the entered text as a transmission message and displays, on the touch screen display 2, the notification screen G3 that notifies the user U1 of the determined transmission message (S26). On the notification screen G3, the call receiver ("TO: Hanako") and the transmission message ("Snack in the cupboard") are displayed. The notification screen G3 has the call button G31 for making an outgoing call and the edit button G32 for editing the transmission message. For example, on detecting an operation on the call button G31, the electronic device 1 transmits the transmission message along with making an outgoing call.

Figure 7:
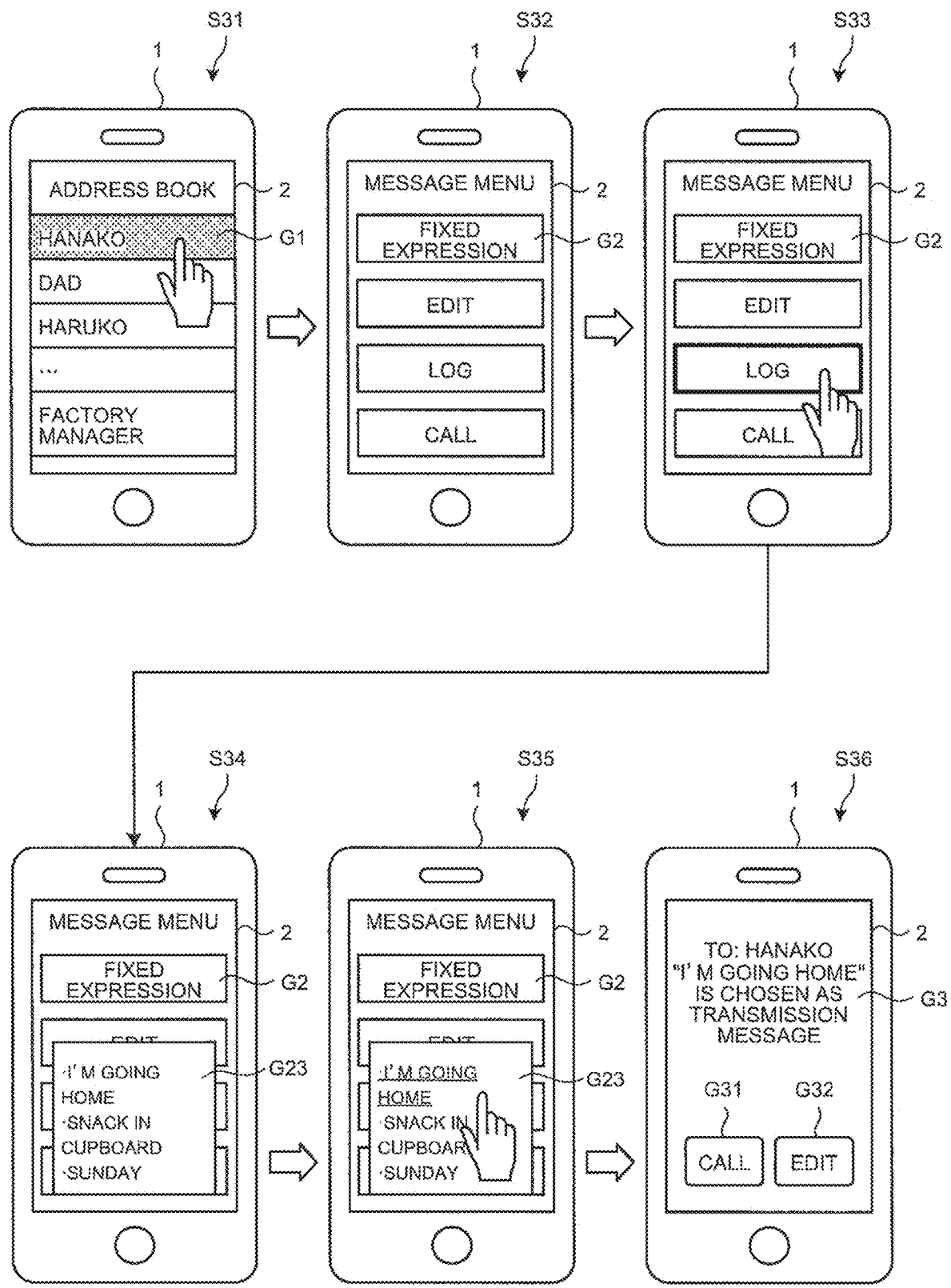
FIG. 7 is a diagram of the exemplary process based on the add-ons of the electronic device according to the embodiment.

FIG. 7 illustrates, as the process based on the add-ons relating to input of a transmission message to be transmitted along with making an outgoing call, an exemplary process of displaying, on the touch screen display 2, the logs of messages that can be chosen as a transmission message in association with choosing the call receiver.

Specifically, when a call receiver ("Hanako") is chosen on the address book screen G1 that is displayed on the touch screen display 2 (S31), the electronic device 1 displays, on the touch screen display 2, the message menu screen G2 containing the add-ons relating to input of a transmission message to be transmitted along with making an outgoing call (S32).

When "log" is chosen as a menu item on the message menu screen G2 (G33), the electronic device 1 displays, on the touch screen display 2, the message log list G23 listing multiple possible inputs that can be chosen as a transmission message (S34).

When one of the possible inputs is chosen on the message log list G23 (S35), the electronic device 1 determines the chosen possible input as a transmission message and displays, on the touch screen display 2, the notification screen G3 that notifies the user U1 of the determined transmission message (S36). On the notification screen G3, the call receiver ("TO: Hanako") and the transmission message ("I'm going home") are displayed. The notification screen G3 has the call button G31 for making an outgoing call and the edit button G32 for editing the transmission message. For example, on detecting an operation on the call button G31, the electronic device 1 transmits the transmission message along with making an outgoing call.

Figure 8:
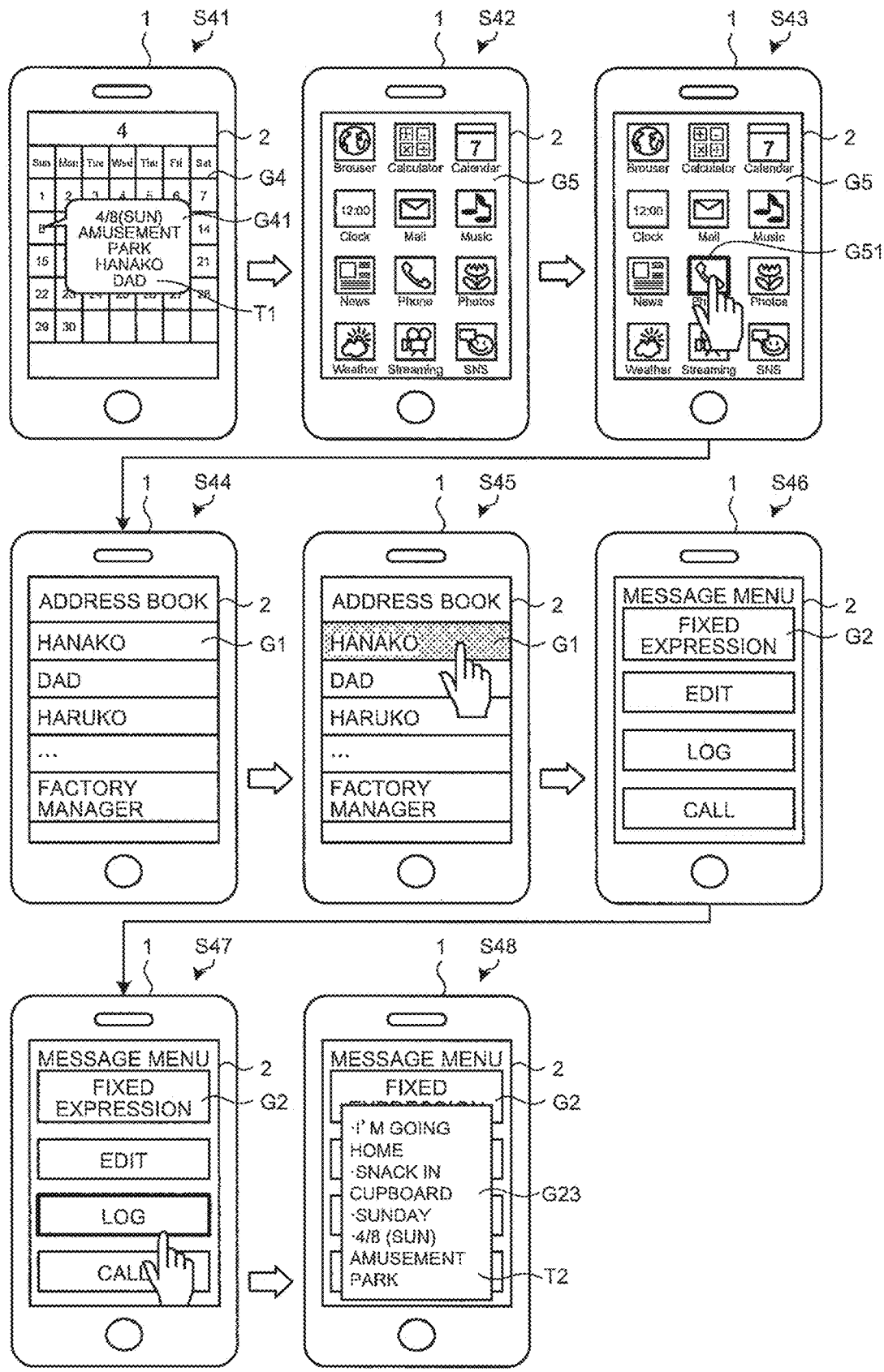
FIG. 8 is a diagram of the exemplary process based on the add-ons of the electronic device according to the embodiment.

FIG. 8 illustrates an exemplary process of reflecting a text contained in an application execution log in the logs of messages that can be chosen as a transmission message in association with choosing a call receiver in the example illustrated in FIG. 7.

Specifically, the electronic device 1 displays a calendar screen G4 that is provided by the calendar application 9E on the touch screen display 2 and, for example, in response to an operation performed by the user U1, displays a pop-up G41 where a text T1 represented in the schedule is written in an enlarged manner on the calendar screen G4 (S41).

The electronic device 1, for example, switches the calendar screen G4 to the home screen G5 in response to an operation performed by the user U1 and causes the touch screen display 2 to display the home screen G5 (S42).

On detecting an operation on the icon G51 to display the address book screen G1 on the home screen G5 (S43), the electronic device 1 displays the address book screen G1 that is displayed on the touch screen display 2 (S44).

When a call receiver ("Hanako") is chosen on the address book screen G1 that is displayed on the touch screen display 2 (S45), the electronic device 1 displays, on the touch screen display 2, the message menu screen G2 containing the add-ons relating to input of a transmission message to be transmitted along with making an outgoing call (S46).

When "log" is chosen as a menu item on the message menu screen G2 (S47), the electronic device 1 displays, on the touch screen display 2, the message menu screen G2 on which the text T2 contained in the log of execution of the calendar application 9E is reflected in the message log list G23 where multiple possible inputs that can be chosen as a transmission message are listed (S48). The text T2 that is reflected in the message log list G23 ("4/8 (Sun) Amusement park") is part of the text T1 ("4/8 (Sun) Amusement park, Hanako, Dad") representing the schedule that is displayed in an enlarged manner as the pop-up G41 on the calendar screen G4 of the calendar application 9E.

When reflecting a text contained in an application execution log in the message log list G23, the electronic device 1 may analyze the text contained in the application execution log and reflect, in the message log list G23, only texts relating to the call receiver that Is chosen on the address book screen 61. In the example illustrated in FIG. 8, the same text as "Hanako" that is chosen as the call receiver is contained in the pop-up G41 on the calendar screen G4 and thus the electronic device 1 determines that the call receiver that is chosen on the address book screen G1 and the text contained in the application execution log have high relevance and reflects the text contained in the pep-up G41 in the message log list G23 on the calendar screen G4.

Figure 9:
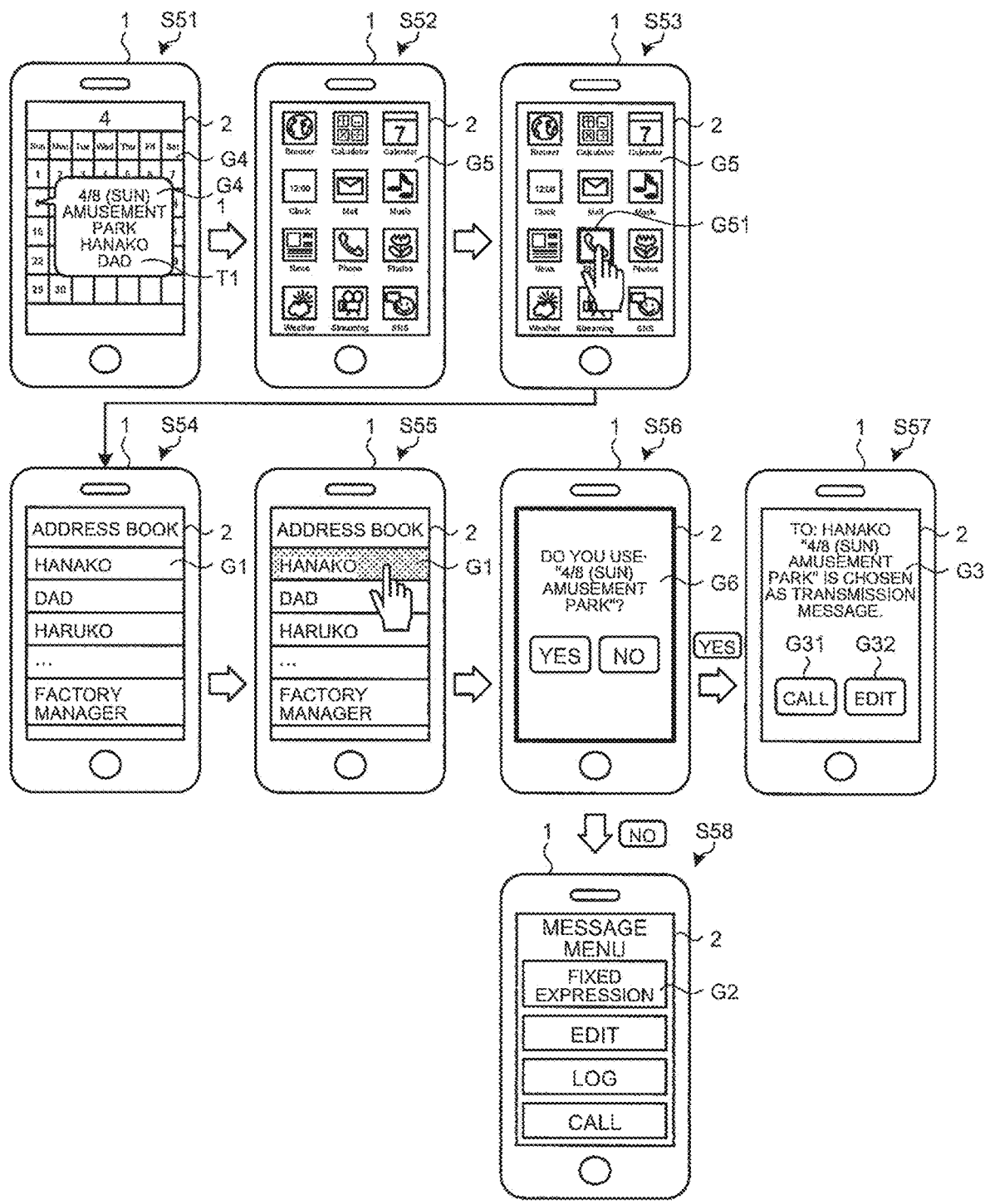
FIG. 9 is a diagram of the exemplary process based on the add-ons of the electronic device according to the embodiment.

FIG. 9 illustrates another example of the process illustrated in FIG. 9. The process represented in SSI to S55 among the process illustrated in FIG. 9 corresponds to the process represented in S41 to S45 and thus description thereof will be omitted.

When a call receiver ("Hanako") is chosen on the address book screen G1 that is displayed on the touch screen display 2 (S55), the electronic device 1 displays a check screen G6 for checking whether at least part (("4/8 (Sun) Amusement park") is exemplified in FIG. 9) of the text T1 ("4/8 (Sun) Amusement park, Hanako, Dad") is used as a transmission message (356). The check screen G6 includes at least part of the text T1 ("4/8 (Sun) Amusement park" exemplified in FIG. 9), a button ("Yes" button exemplified in FIG. 9) to choose using the text ("4/8 (Sun) Amusement park" exemplified in FIG. 9) as a transmission message, and a button ("No" button exemplified in FIG. 9) not to choose using the text ("4/8 (Sun) Amusement park" exemplified in FIG. 9) as a transmission message.

When the "Yes" button is chosen on the check screen G6, the electronic device 1 causes the touch screen display 2 to display the notification screen G3 that notifies the user that at least part ("4/8 (Sun) Amusement park" exemplified in FIG. 9) of the text T1 was chosen as a transmission message (S57). On the other hand, when the "No" button is chosen on the check screen G6, the electronic device 1 displays the message menu screen G2 (S58). When the "No" button is chosen on the check screen G6, the electronic device 1 need not reflect at least part ("4/8 (Sun) Amusement park" exemplified in FIG. 9) of the text T1 in the message log list G23 or may reflect at least part ("4/8 (Sun) Amusement park" exemplified in FIG. 9) of the text T1 in the message log list G23. Instead of causing display of the check screen G6, the electronic device 1 may cause, on the address book screen G1, display of an image, such as a pop-up for checking whether to use at least part ("4/8 (Sun) Amusement park" exemplified in FIG. 9) of the text T1 ("4/8 (Sun) Amusement park, Hanako, Dad") as a transmission message.

Figure 10:
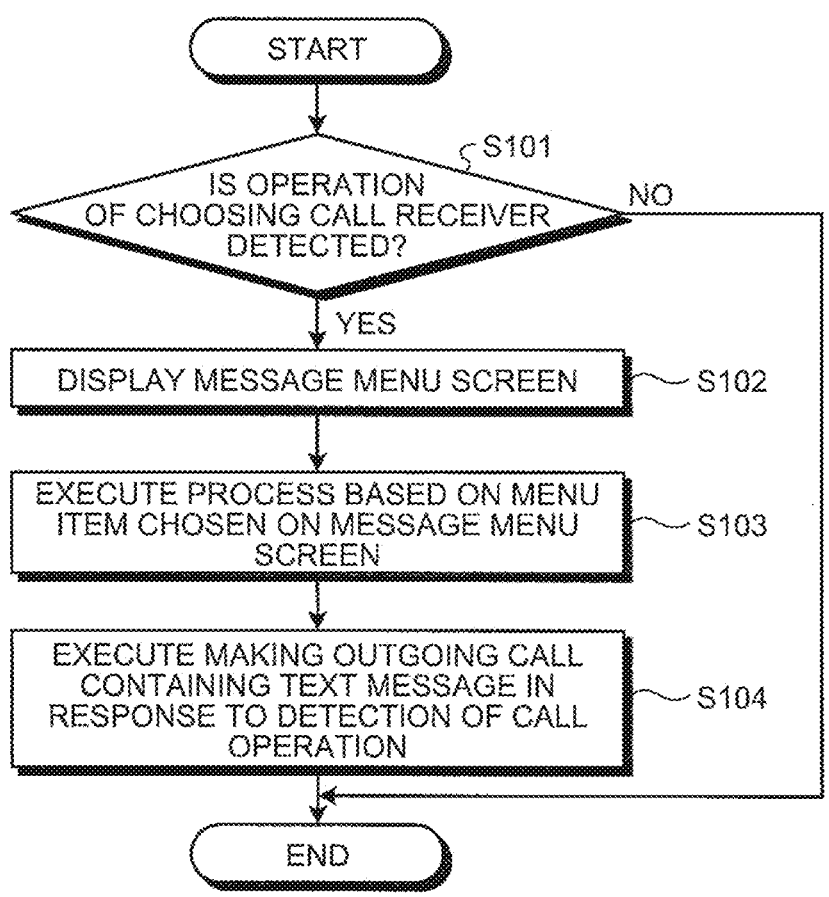
FIG. 10 is a flowchart of an exemplary flow of a process that is executed by the electronic device according to the embodiment.

Using FIG. 10, a flow of a process performed by the electronic device according to the embodiment will be described. FIG. 10 is a flowchart of an exemplary flow of a process that is executed by the electronic device according to the embodiment. The process illustrated in FIG. 10 is implemented by the processor 10 executing the control program 9A, or the like.

As illustrated in FIG. 10, the processor 10 determines whether an operation of choosing a call receiver is detected (step S101).

When it is determined that the operation of choosing a call receiver is detected (YES at step S101), the processor 10 causes the touch screen display 2 to display the message menu screen G2 containing the add-ons relating to input of a transmission message to be transmitted along with making an outgoing call (step S102).

The processor 10 subsequently executes a process based on a menu item chosen on the message menu screen G2 (step S103).

In response to detection of the call-making operation, the processor 10 executes making an outgoing call containing a transmission text message (step S104) and ends the process illustrated in FIG. 10.

When it is determined that the operation of choosing a call receiver is not detected (NO at step S101), the processor 10 ends the process illustrated in FIG. 10.

When the operation of choosing a call receiver is detected, the above-described electronic device 1 causes the touch screen display 2 to display the message menu screen G2 containing the add-ons relating to input of a transmission message to be transmitted along with making an outgoing call. This allows the electronic device 1 to execute a process based on the add-ons relating to input of a transmission message to be transmitted along with making an outgoing call according to an easy operation performed by the user and enables improvement of an operational input method performed by the user to make an outgoing call attached with text information.

Other Embodiments

The electronic device 1 according to the above-described embodiment is not limited to the above-described embodiment. In other words, various modifications of the electronic device 1 may be made within the scope of the electronic device 1. Another embodiment of the electronic device 1 will be described below.

For example, in response to a chosen area specifying operation for a text that is performed on the touch screen display 2, the electronic device 1 may execute the process based on add-ons relating to input of a transmission message to be transmitted along with making an outgoing call.

The functions provided by the control program 9A may include a function of, when a chosen area specifying operation of choosing a text on the touch screen display 2 is performed, causing the touch screen display 2 to display a sub-menu screen that accepts an operation of making an outgoing call from a user in accordance with the chosen area specifying operation. The functions provided by the control program 9A may include a function of, when making an outgoing call is chosen on the sub-menu screen, causing the touch screen display 2 to display the address book screen G1 to choose a call receiver and, in accordance with choosing a call receiver on the address book screen G1, executing a process of determining, as a transmission message, the text that is chosen by the chosen area specifying operation.

Executing the control program 9A enables the processor 10 to execute a process of, when the chosen area specifying operation of choosing a text on the touch screen display 2 is performed, causing the touch screen display 2 to display the sub-menu screen that accepts an operation of making an outgoing call from the user in association with the chosen area specifying operation, when making an outgoing call is chosen on the sub-menu screen, causing the touch screen display 2 to display the address book screen G1 to choose a call receiver, and, in association with choosing a call receiver on the address book screen G1, determining a text that is chosen by the chosen area specifying operation as a transmission message.

Using FIGS. 11 and 12, an exemplary process based on add-ons of the electronic device according to the another embodiment will be described. FIGS. 11 and 12 are diagrams illustrating an exemplary process based on add-ons of the electronic device according to the another embodiment.

FIG. 11 illustrates an exemplary process corresponding to the case where a text describing a schedule in the pop-up G41 on the calendar screen G4 is chosen by the chosen area specifying operation.

Specifically, the electronic device 1 displays the calendar screen G4 that is provided by the calendar application 9E on the touch screen display 2 and, for example, in response to an operation performed by the user U1, displays in an enlarged manner the pop-up G41 where the text T1 represented in the schedule is written on the calendar screen G4 (S61).

For example, on accepting the chosen area specifying operation of choosing a text representing the schedule that is written in the pop-up G41, the electronic device 1 displays the sub-menu screen M1 on the calendar screen G4 (S62).

When making an incoming call is chosen on the sub-menu screen M1 (S63), the electronic device 1 causes the touch screen display 7 to display the address book screen G1 (S64).

When a call receiver ("Hanako") is chosen on the address book screen G1 that is displayed on the touch screen display 2 (S65), the electronic device 1 determines a text that is chosen by the chosen area specifying operation as a transmission message and causes the touch screen display 2 to display the notification screen G3 that notifies the user U1 of the determined transmission message (S66).

FIG. 12 illustrates an exemplary process corresponding to the case where a text that is written on the web screen G7 is chosen by the chosen area specifying operation.

Specifically, the electronic device 1 displays the web screen G7 that is displayed by the browser application 9D on the touch screen display 2 (S71).

On accepting the chosen area specifying operation of choosing a text T3 that is written on the web screen G7, the electronic device 1 causes display of the sub-menu screen M1 on the calendar screen G4 (S72).

When making an outgoing call is chosen on the sub-menu screen M1 (S73), the electronic device 1 causes the touch screen display 2 to display the address book screen G1 (S74).

When a call receiver ("Haruko") is chosen on the address book screen G1 that is displayed on the touch screen display 2 (S75), the electronic device 1 determines the text T3 that is chosen by the chosen area specifying operation as a transmission message and causes the touch screen display 2 to display the notification screen G3 that notifies the user U1 of the determined transmission message (S76).

Figure 13:
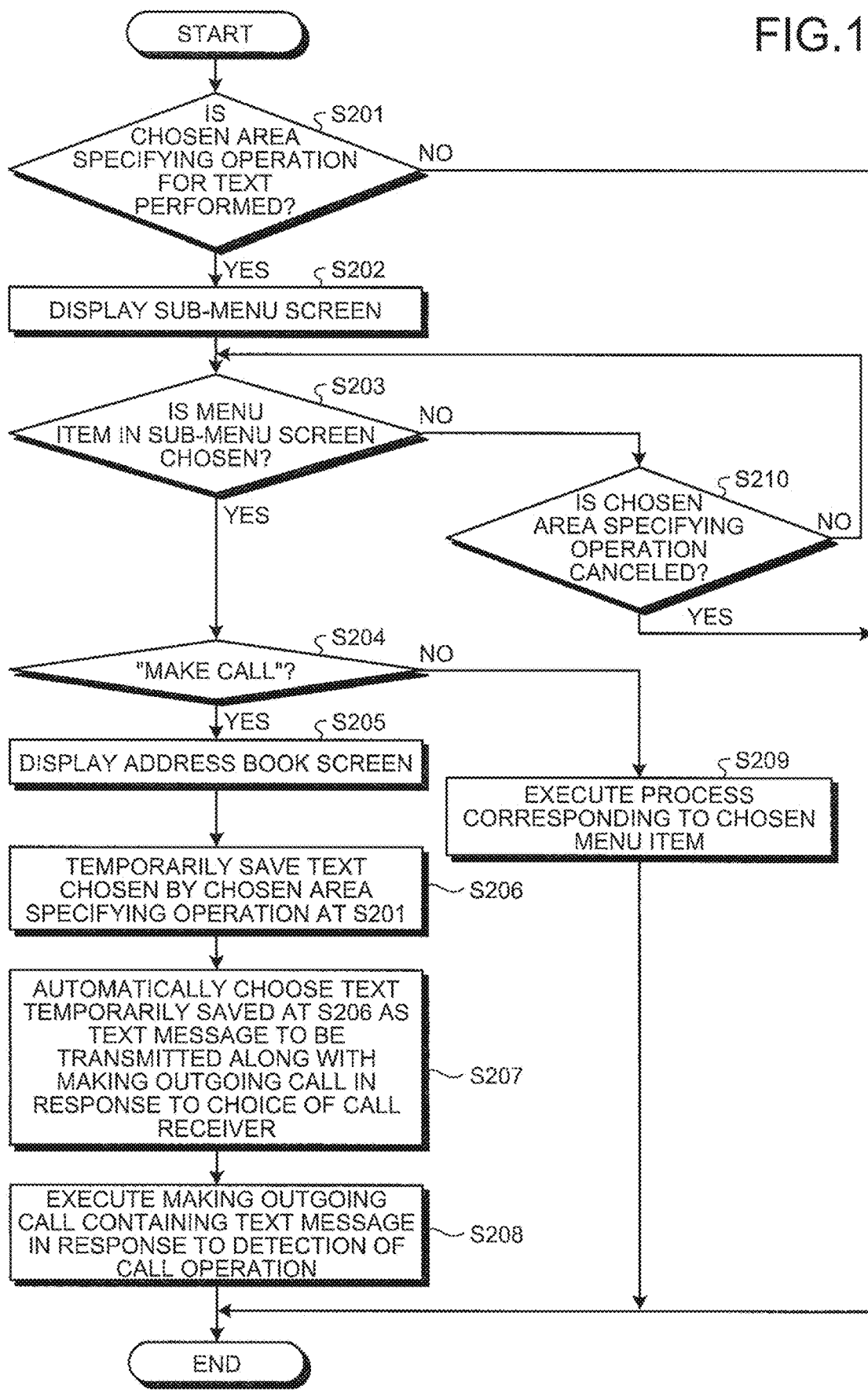
FIG. 13 is a flowchart of a flow of a process performed by an electronic device 1 according to the another embodiment.

Using FIG. 13, a flow of a process performed by the electronic device 1 according to the another embodiment; will be described. FIG. 13 is a flowchart of the flow of the process performed by the electronic device 1 according to the another embodiment. The process illustrated in FIG. 13 is implemented by the processor 10 executing the control program 9A, or the like.

As illustrated in FIG. 13, the processor 10 determines whether the chosen area specifying operation for a text is detected (step S201).

When it is determined that the chosen area specifying operation for a text is detected (YES at step S201), the processor 10 causes display of the sub-menu screen M1 (step S202).

Subsequently, the processor 10 then determines whether a menu item is chosen in the sub-menu screen M1 (step S203).

When it is determined that a menu item is chosen in the submenu screen M1 (YES at step S203), the processor 10 determines whether the chosen menu item is "making an outgoing call" (step S204).

When it is determined that the chosen menu item is "making an outgoing call" (YES at step S204), the processor 10 displays the address book screen G1 (step S205) and temporarily saves the text chosen by the chosen area specifying operation at step S201 (step S206).

In response to choosing a call receiver on the address book screen G1, the processor 10 then automatically chooses the text that is temporarily saved at step S206 as a transmission text message to be transmitted along with making an outgoing call (step S207).

In response to detection of the call-making operation, the processor 10 executes making an outgoing call containing the transmission text message (step S208) and ends the process illustrated in FIG. 13.

When it is determined that the chosen menu item is not "making an outgoing call" (No at step S204), the processor 10 executes a process corresponding to the menu item that is chosen on the sub-menu screen M1 (step S209) and ends the process illustrated in FIG. 13.

When it is determined that no menu item is chosen on the sub-menu screen M1 (No at step S203), the processor 10 determines whether the chosen area specifying operation is canceled (step S210).

When it is determined that the chosen area specifying operation is not canceled (No at step S210), the processor 10 returns to the determination at step S203. On the other hand, when it is determined that the chosen area specifying operation is canceled (Yes at step S210), the processor 10 ends the process illustrated in FIG. 13.

When it is determined that the chosen area specifying operation for a text is not detected at step S201 (No at step S201), the processor 1C ends the process illustrated in FIG. 13.

As described above, when a call receiver is chosen after the chosen area specifying operation for a text that is performed on the touch screen display 2 is performed, the electronic device 1 automatically determines the text chosen by the chosen area specifying operation as a transmission message to be transmitted along with making an outgoing call. This allows the user of the electronic device 1 to execute choosing a text and making an outgoing call attached with the transmission message through a series of operations easily.

For example, when a text message is contained in an incoming-call log that is chosen as a call receiver on an incoming-call log screen, the electronic device 1 may execute a process of automatically choosing the text message as a transmission message.

The functions provided by the control program 9A may include a function of, when a text message is contained in an incoming-call log that is chosen as a call receiver, executing a process of automatically choosing the text message as a transmission message.

Executing the control program 9A enables the processor 10 to, when a text message is contained in an incoming-call log that is chosen as a call receiver, execute a process of automatically choosing the text message as a transmission message.

Figure 14:
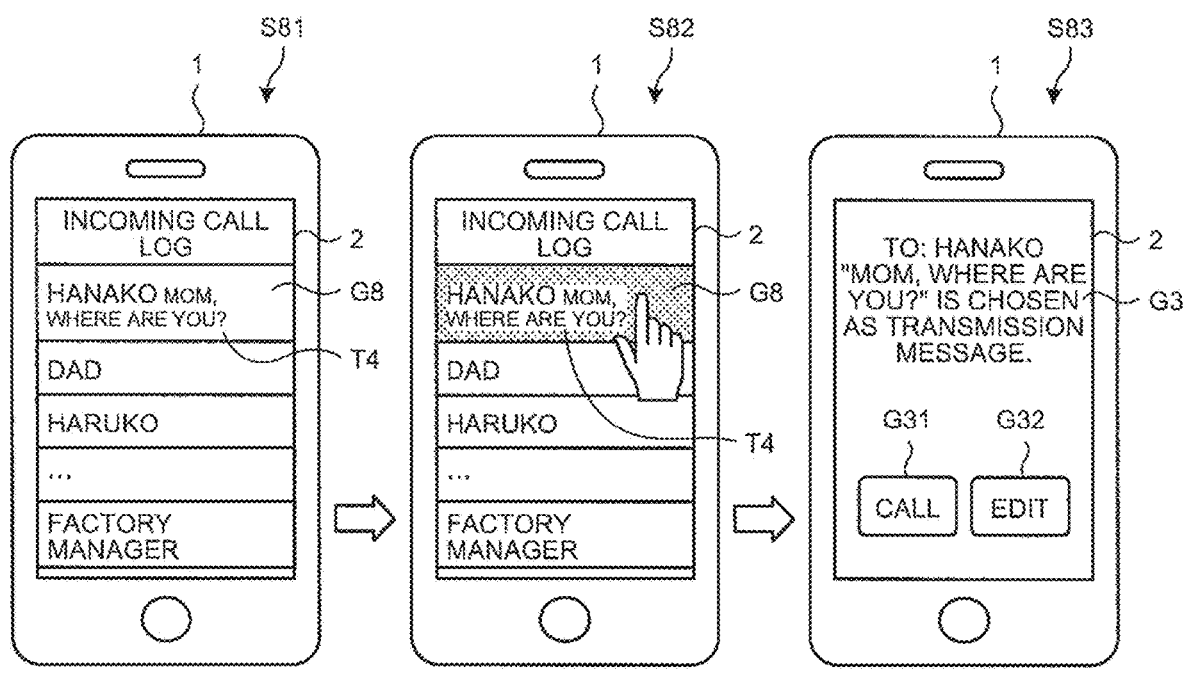
FIG. 14 is a diagram of an exemplary process based on the add-ons of the electronic device according to a still another embodiment.

Using FIG. 14, an exemplary process based on the add-ons of the electronic device according to still another embodiment will be describe. FIG. 14 is a diagram of the exemplary process based on the add-ons of the electronic device according to the still another embodiment.

FIG. 14 illustrates an exemplary process corresponding to the case where a text message is contained in an incoming-call log that is chosen as a call receiver on an incoming-call log screen G8.

Specifically, the electronic device 1, for example, causes the touch screen display 2 to display the incoming-call log screen G8 in response to an operation performed by the user U1 (S81).

When a call receiver ("Hanako") is chosen from the incoming-call logs displayed on the incoming-call log screen G8 (S82), in the case where a text message T4 (Mom, where are you?) is contained in the chosen incoming-call log ("Hanako"), the electronic device 1 automatically chooses the text message T4 as a transmission message and displays, on the touch screen display 2, the notification screen G3 that notifies the user U1 of the automatically-chosen transmission message (S83).

Figure 15:
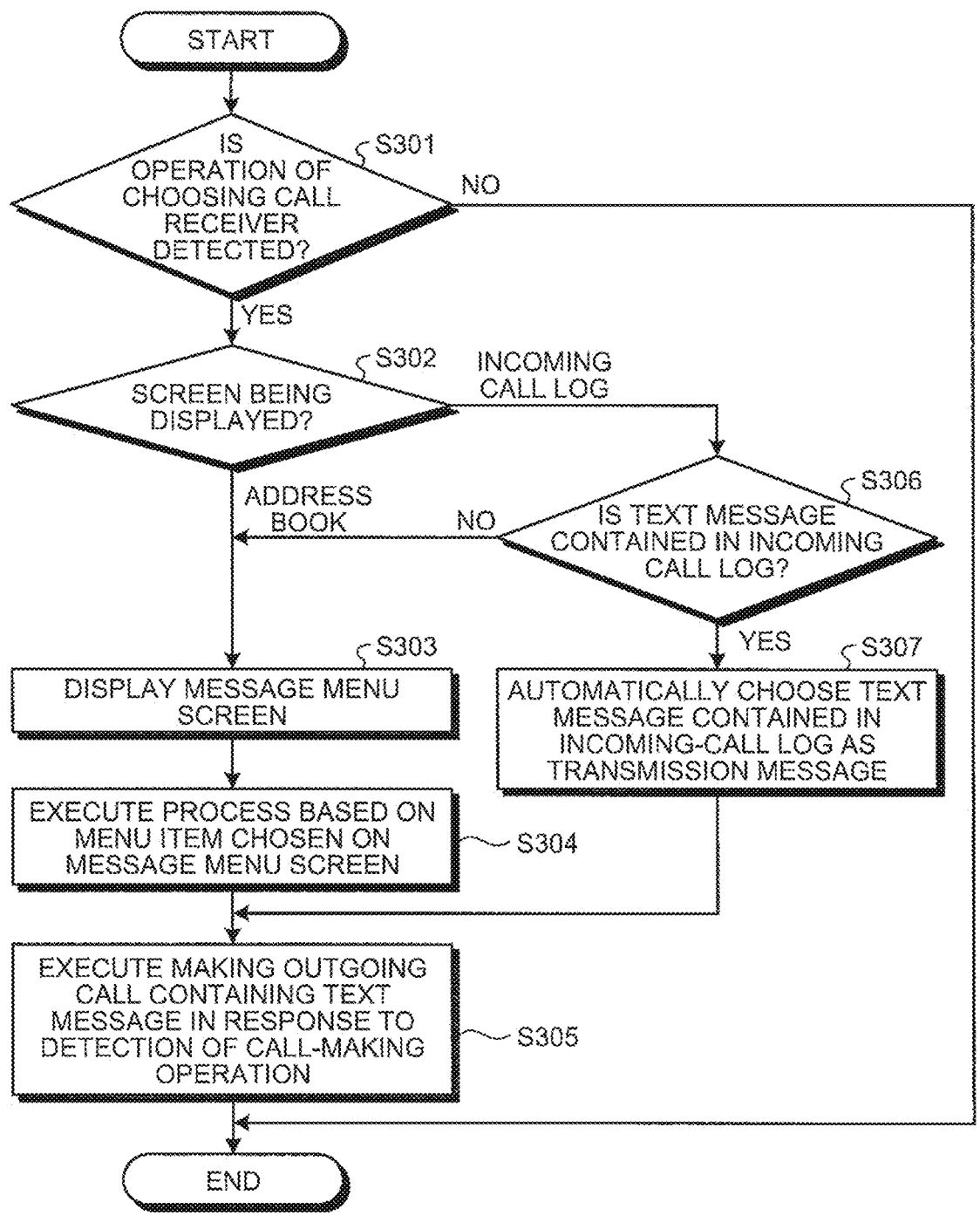
FIG. 15 is a flowchart of an exemplary flow of a process that is executed by the electronic device according to the still another embodiment.

Using FIG. 15, a flow of a process performed by the electronic device according to the still another embodiment will be described. FIG. 15 is a flowchart of the exemplary flow of the process that is executed by the electronic device according to the still another embodiment. The process illustrated in FIG. 15 is implemented by the processor 10 executing the control program 9A, or the like.

As illustrated in FIG. 15, the processor 10 determines whether the operation of choosing a call receiver is detected (S301). When it is determined that the operation on choosing a call receiver is not detected (No at step S301), the processor 10 ends the process illustrated in FIG. 15.

When it is determined that the operation of choosing a call receiver is detected (Yes at step S301), the processor 10 determines which of the address book screen and the incoming-call log screen the screen being displayed is (step S302).

When it is determined that the screen being displayed is the address book screen, the processor 10 causes the touch screen display 2 to display the message menu screen G2 (step S303).

The processor 10 then executes a process based on a menu item that is chosen on the message menu screen G2 (step S304).

The processor 10 then executes making an outgoing call containing a transmission text message in response to a detection of a call-making operation (step S305) and ends the process illustrated in FIG. 15.

When it is determined that the screen being displayed is the incoming-call log screen at step S302, the processor 10 determines whether the incoming-call log that is chosen as a call receiver contains a text message (step S306).

When it is determined that the incoming-call log that is chosen as a call receiver contains a text message (YKS at step S306), the processor 10 automatically chooses the text message contained in the incoming-call log as a transmission text message (step S307) and proceeds to the step S305 of the process.

When it is determined that the incoming-call log that is chosen as a call receiver contains no text message (No at step S306), the processor 10 proceeds to step S303 of the process.

As described above, when an incoming-call log that is chosen as a call receiver contains a text message, the electronic device 1 automatically chooses the text message contained in the incoming-call log as a transmission text message. This allows the user of the electronic device 1 to, when making an outgoing call, easily input a text message representing that the call is a reply to the incoming-call log.

In the example illustrated in FIGS. 14 and 15, when an incoming-call log that is chosen as a call receiver is a missed phone call log for which making a return call is easily assumable, the text message contained in the missed phone call log may be automatically chosen as a transmission text message.

FIG. 16 is a diagram illustrating an exemplary process based on the add-ons of the electronic device according to still another embodiment. As illustrated in FIG. 16, when the electronic device 1 makes an outgoing call attached with no text message to the electronic device 100, the electronic device 1 may measure frequency of texts during a talk between the user U1 and the user U2, extract the most frequent text, and display the text as a title of an outgoing-call log on an outgoing-call log screen G9.

Characteristic embodiments have been described in order to completely and clearly disclose the technology according to the attached claims. The attached claims however should not be limited to the above-described embodiments and should be embodied by all modifications and alternative configurations that can be made by those skilled in the art within the scope of fundamental items described herein.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
a display;
a communication unit; and
a processor configured to execute instructions to:
execute a first add-on process of displaying, when a user of the electronic device selects a call destination from an address book screen displayed on the display, a menu screen for inputting a text message, wherein the menu screen comprises a button for displaying a message log list including a plurality of candidate text strings selectable as the text message,
execute a second add-on process of automatically adding, to the plurality of candidate text strings of the message log list, a first text string included in an execution log of an application,
execute a third add-on process of setting, when the user selects one of the plurality of candidate text strings among the message log list, the selected candidate text string as the text message,
execute a fourth add-on process of making an outgoing call with the set text message to the selected call destination in response to an operation of the user, and
when the user does not select the call destination on the address book screen, continue displaying the address book screen.

2. The electronic device according to claim 1, wherein the plurality of candidate text strings include
a fixed phrase set in advance, and
a text string in a previous communication with the selected call destination.

3. The electronic device according to claim 1, wherein the processor is further configured to, in association with the selected call destination, execute a further add-on process of causing the display to display a user interface for editing the text message.

4. The electronic device according to claim 1, wherein the processor is further configured to, when a previous text message is contained in an incoming-call log associated with the selected call destination, automatically choose the previous text message as the text message to be sent with the outgoing call.

5. The electronic device according to claim 1, wherein the processor is further configured to:
record personal information of a plurality users who are authorized to select the call destination in an address book corresponding to the address book screen,
create the first text string by removing personal information from a second text string displayed on an execution screen of another application, the removed personal information corresponding to personal information recorded in the address book,
record the first text string to the execution log of the application, and
add the first text string to the displayed message log list.

6. An electronic device, comprising:
a display;
a communication unit; and
a processor configured to execute instructions to:
execute a first add-on process of displaying, when a first application is executed, on an execution screen of the first application, a sub-menu screen to accept an operation from a user of the electronic device to start a second application different from the first application, in response to the user's selection of a text string on the execution screen of the first application,
execute a second add-on process of displaying, in response to the operation of the user on the sub-menu screen, an address book screen to select a call destination instead of the execution screen,
execute a third add-on process of setting the selected text string as a text message, execute a fourth add-on process of making an outgoing call including the text message to the selected call destination in response to a further operation of the user, and when the user does not select the call destination on the address book screen, continue displaying the address book screen.

7. A control method executed by an electronic device including a display and a communication unit, the method comprising:

executing a first add-on process of displaying, when a first application is executed, on an execution screen of the first application, a sub-menu screen to accept an operation from a user of the electronic device to start a second application different from the first application, in response to the user's selection of a text string on the execution screen of the first application, executing a second add-on process, in response to the operation of the user on the sub-menu screen, of displaying an address book screen to select a call destination instead of the execution screen, executing a third add-on process of setting the selected text string as a text message, executing a fourth add-on process of making the outgoing call including the text message to the selected call destination, in response to a further operation of the user, and when the user does not select the call destination on the address book screen, continuing displaying the address book screen.

8. A non-transitory storage medium that stores a control program for causing, when executed by an electronic device including a display and a communication module, the electronic device to execute:

executing a first add-on process of displaying, when a first application is executed, on an execution screen of the first application, a sub-menu screen to accept an operation from a user of the electronic device to start a second application different from the first application, in response to the user's selection of a text string on the execution screen of the first application, executing a second add-on process, in response to the operation of the user on the sub-menu screen, of displaying an address book screen to select a call destination instead of the execution screen, executing a third add-on process of setting the selected text string as a text message, executing a fourth add-on process of making the outgoing call including the text message to the selected call destination, in response to a further operation of the user, and when the user does not select the call destination on the address book screen, continuing displaying the address book screen.

* * * * *